United States Patent [19]
Haneda

[11] Patent Number: 5,936,796
[45] Date of Patent: Aug. 10, 1999

[54] LIBRARY APPARATUS

[75] Inventor: Mamoru Haneda, Kawasaki, Japan

[73] Assignee: Fujitsu Limited, Kawasaki, Japan

[21] Appl. No.: 09/020,614

[22] Filed: Feb. 9, 1998

[30] Foreign Application Priority Data

Aug. 29, 1997 [JP] Japan ................................. 9-234054

[51] Int. Cl.[6] ................................................. G11B 15/68
[52] U.S. Cl. .......................................................... 360/92
[58] Field of Search ................................. 360/92, 69, 71

[56] References Cited

U.S. PATENT DOCUMENTS

| | | | |
|---|---|---|---|
| 5,432,656 | 7/1995 | Motoyama et al. | 360/69 |
| 5,627,696 | 5/1997 | Tomi et al. | 360/71 |
| 5,654,838 | 8/1997 | Motoyama et al. | 360/71 |
| 5,659,434 | 8/1997 | Yamakawa et al. | 360/69 |

FOREIGN PATENT DOCUMENTS

08235729  9/1996  Japan .

Primary Examiner—John H. Wolff
Attorney, Agent, or Firm—Greer, Burns & Crain Ltd

[57] ABSTRACT

A library apparatus including a feeder mechanism for an accessor robot. The feeder mechanism includes a feeding cable for the accessor robot. The feeding cable has a first end and a second end. The first end is connected to the accessor robot, and the second end is connected to a reference position (e.g., a housing of the library apparatus). The feeding cable is wrapped around a cable drum. The cable drum is rotatably supported to an arm. A wire rope acts on the arm to apply a tension to the feeding cable. A stress removing mechanism for removing a torsional stress of the wire rope is connected to at least one end of the wire rope. The stress removing mechanism rotatably supports the wire rope. With this configuration, the torsional stress of the wire rope is removed to thereby improve fatigue characteristics or the like of the wire rope and accordingly improve the reliability of the library apparatus.

7 Claims, 12 Drawing Sheets

LIBRARY APPARATUS

BACKGROUND OF THE INVENTION

1. Field of the Invention

The present invention relates generally to a feeder mechanism for a mobile robot, and more particularly to application of the feeder mechanism to a library apparatus having a plurality of cells each for storing a cartridge in which a recording medium is contained.

2. Description of the Related Art

A library apparatus has a plurality of cells each for storing a cartridge such as a magnetic tape cartridge and an optical disk cartridge in which an information recording medium is contained. The cartridge stored in any cell selected from the plural cells is loaded into a drive unit provided in the library apparatus. Then, information processing is carried out on the medium contained in the loaded cartridge by the drive unit. More specifically, information recording and/or reproduction is carried out on the medium by the drive unit.

The library apparatus usually has a cartridge accessor station (CAS) for allowing insertion and ejection of the cartridge. The library apparatus further has an accessor robot acting on the cartridge to transfer the cartridge among the cartridge accessor station, each cell, and the drive unit.

In a large-scale library apparatus, the accessor robot is moved along at least one straight line specifically in a horizontal direction to enable efficient transfer of the cartridge. For example, in a library apparatus described in Japanese Patent Laid-open No. 8-235729, an accessor robot is moved by a drive force of its own motor along a straight rail extending in a horizontal direction.

To supply electric power to the accessor robot or transfer a control signal, a feeding cable is connected to the accessor robot. In a large-scale library apparatus, the accessor robot moves over 20 m in some cases, and accordingly the feeding cable tends to become long, so that a special feeder mechanism attempts have been made to remove this tendency long feeding cable.

To apply a given tension to the cable and thereby prevent slack of the cable irrespective of a moving position of the accessor robot, a wire rope and an idler pulley (running pulley) may be used. One end of the wire rope is connected to a housing of the library apparatus, and the other end of the wire rope is connected to the accessor robot. When the accessor robot moves a certain distance, the idler pulley moves half the distance. Accordingly, by wrapping the cable around a cable drum moving with the idler pulley, fixing one end of the cable to the accessor robot, and fixing the other end of the cable to the housing, a constant tension is always applied to the cable.

In recent years, a high moving speed of the accessor robot has been required in response to a high access speed. Further, an increase in acceleration of the accessor robot causes significant damage to the wire rope.

SUMMARY OF THE INVENTION

It is therefore an object of the present invention to provide a library apparatus having high reliability by improving the durability of the wire rope.

The other objects of the present invention will become apparent from the following description.

In accordance with an aspect of the present invention, there is provided a feeder mechanism for a mobile robot. The feeder mechanism includes a robot movable along at least one straight line and a feeding cable for the robot. The feeding cable has a first end and a second end. The first end is connected to the robot, and the second end is fixed to a reference position (e.g., a housing of a library apparatus). The feeding cable is wrapped around a cable drum. The cable drum is rotatably supported to an arm. A wire rope acts on the arm to apply a tension to the feeding cable. The library apparatus is characterized especially by means for removing a torsional stress of the wire rope. The removing means is connected to at least one end of the wire rope to rotatably support the wire rope.

With this configuration, the torsional stress of the wire rope is removed to thereby improve fatigue characteristics or the like of the wire rope and accordingly improve the reliability of the feeder mechanism.

Preferably, the means for removing the torsional stress of the wire rope comprises a thrust bearing fixed to the robot or fixed with respect to the reference position, whereby one end of the wire rope is easily rotatably supported.

Preferably, the feeder mechanism further includes an absorber for reducing changes in tension of the wire rope. Even when an excess tension is applied to the wire rope at starting or stopping the robot, such a tension can be effectively absorbed by the absorber.

In accordance with another aspect of the present invention, there is provided a library apparatus including a cell unit, a drive unit, and an accessor robot. The cell unit has a plurality of cells each for storing a cartridge in which a recording medium is contained. The drive unit performs processing (recording, reproduction, etc.) by use of the recording medium. The accessor robot transfers the cartridge between the cell unit and the drive unit. This library apparatus includes the feeder mechanism according to the present invention.

In a large-scale library apparatus, the travel of the accessor robot is long and the wire rope connected to the accessor robot accordingly tends to become long. Accordingly, a torsional stress is accumulated in the wire rope during repetitions of driving of the accessor robot. However, by applying the feeder mechanism according to the present invention to the accessor robot, it is possible to provide a library apparatus having high reliability.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the drawings.

Figure 1:
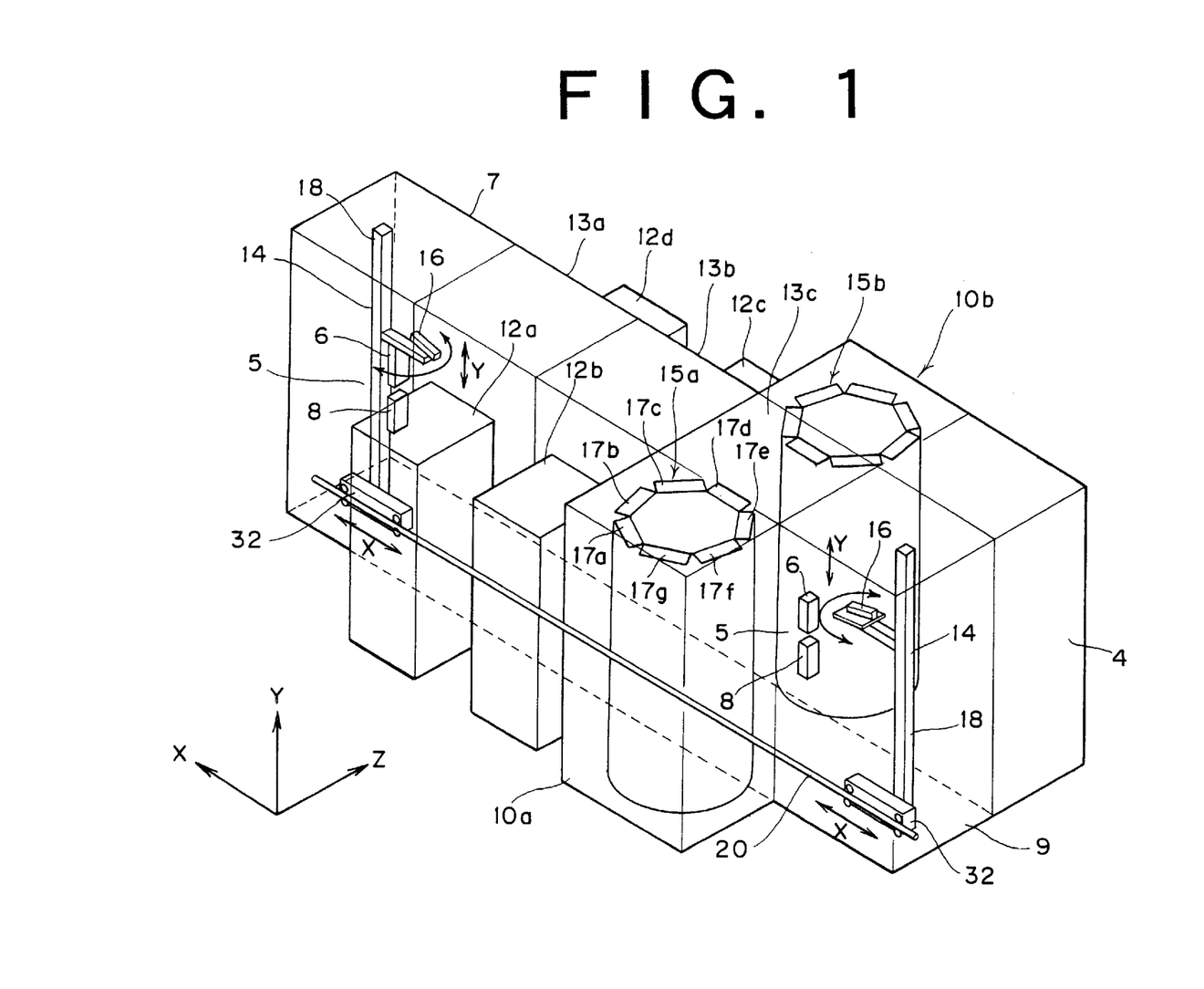
FIG. 1 is a perspective view showing a preferred embodiment of the library apparatus to which the present invention is applied.

FIG. 1 is a perspective view showing a preferred embodiment of the library apparatus according to the present invention. This library apparatus includes two accessor units 7 and 9, three passage units 13a, 13b, and 13c provided between the accessor units 7 and 9, four drive units 12a, 12b, 12c, and 12d and two drum units 10a and 10b provided along the passage units 13a, 13b, and 13c, and a control unit 4 provided corresponding to the accessor unit 9. Each unit may be expansively arranged according to a storage capacity.

Each of the accessor units 7 and 9 has a cartridge access station (CAS) 5 on the front side. Each cartridge access station 5 has a cartridge insertion opening 6 and a cartridge ejection opening 8 rotatable 180° about their respective vertical axes. A rail 20 defining an X axis extends between the accessor units 7 and 9. In this specification, the X axis is defined as a horizontal direction, a Y axis is defined as a vertical direction, and a Z axis is defined as a direction perpendicular to the X axis and the Y axis.

This library apparatus further includes one or more accessor robots 14 movable along the rail 20. In FIG. 1, two accessor robots 14 are normally located on standby in the accessor units 7 and 9. Each accessor robot 14 has a rail base 32 movable along the rail 20, a vertical column 18 fixed to the rail base 32, and a hand assembly 16 movable in the Y-axis direction along the vertical column 18. Accordingly, the hand assembly 16 is movable in the X-axis direction and the Y-axis direction.

The drum units 10a and 10b respectively have cell drums 15a and 15b each having a plurality of cells. Each of the cell drums 15a and 15b has seven cell segments 17a to 17g. Each of the cell segments 17a to 17g has three-row n-column cells. Each cell is adapted to store a cartridge containing a magnetic tape. This cartridge is an I13480 type magnetic tape cartridge, for example.

Each of the drive units 12a, 12b, 12c, and 12d has a plurality of (e.g., four) tape drives. Each tape drive has a cartridge insertion/ejection opening, and performs recording/reproduction of information on the magnetic tape contained in the cartridge inserted from the cartridge insertion/ejection opening.

The accessor robot 14 moves by itself and drives its own hand assembly 16 to thereby transfer the cartridge among each cartridge access station 5, each cartridge insertion/ejection opening of the tape drives, and each cell of the cell drums 15a and 15b. A control printed circuit board for controlling this operation and its related operation is provided in the control unit 4.

Figure 2:
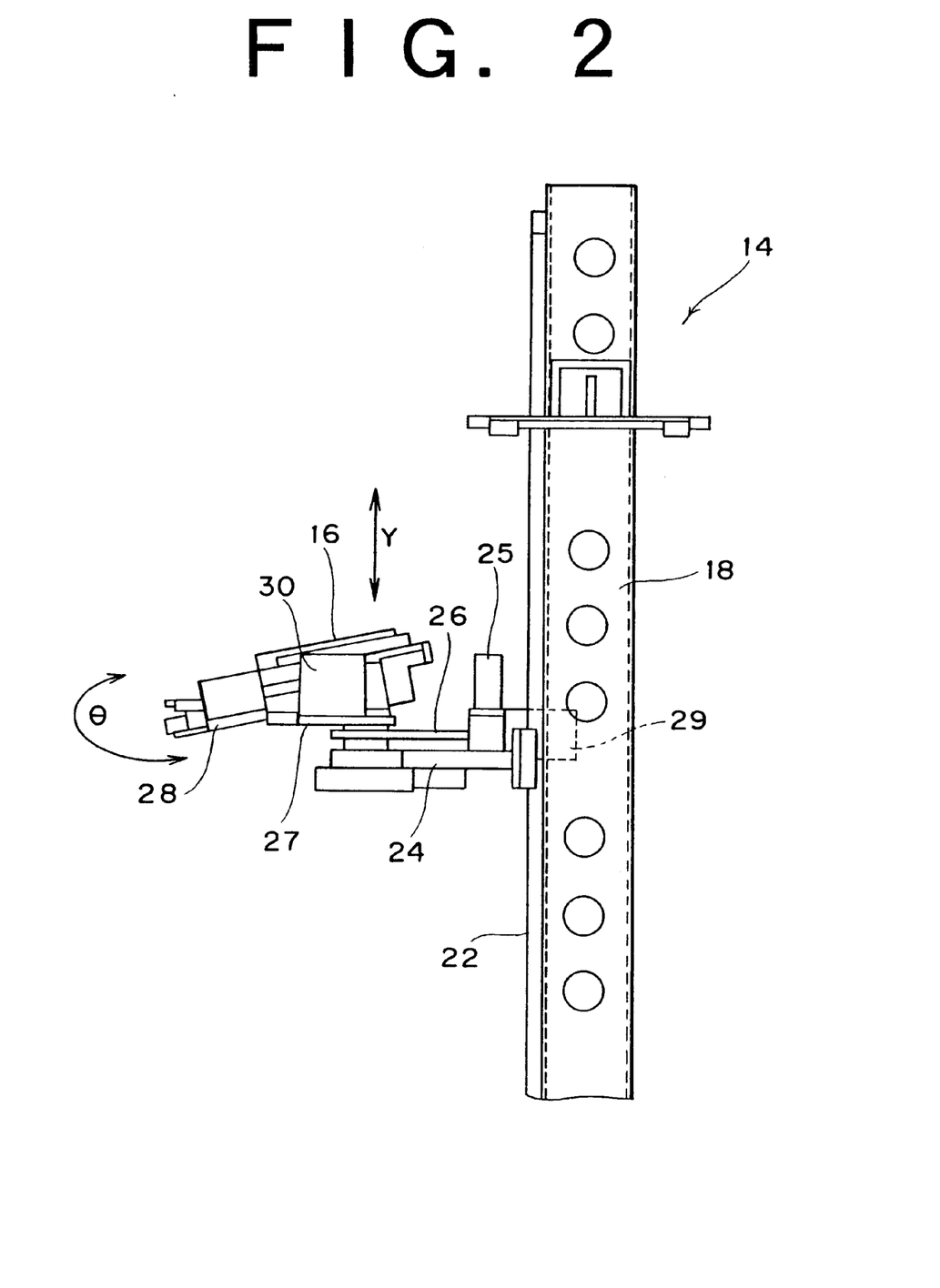
FIG. 2 is a side view of an upper portion of an accessor robot shown in FIG. 1.

FIG. 2 is a side view of an upper portion of each accessor robot 14 shown in FIG. 1. The hand assembly 16 is mounted on a support base 24 vertically movable along a guide rail 22 formed on the vertical column 18. Further mounted on the support base 24 are a motor 25 and a printed circuit board 29 for a control circuit for controlling the motor 25. The support base 24 is guided by the guide rail 22 and moved in the Y-axis direction together with the motor 25 and the printed circuit board 29.

When the motor 25 is driven, a mount base 27 for the hand assembly 16 is rotated as shown by an arrow θ about a vertical axis (an axis parallel to the Y axis) by a timing belt 26 connected to the output shaft of the motor 25. That is, the motor 25, the hand assembly 16, and the mount base 27 constitute a mechanism for moving the cartridge in the θ direction.

Figure 3:
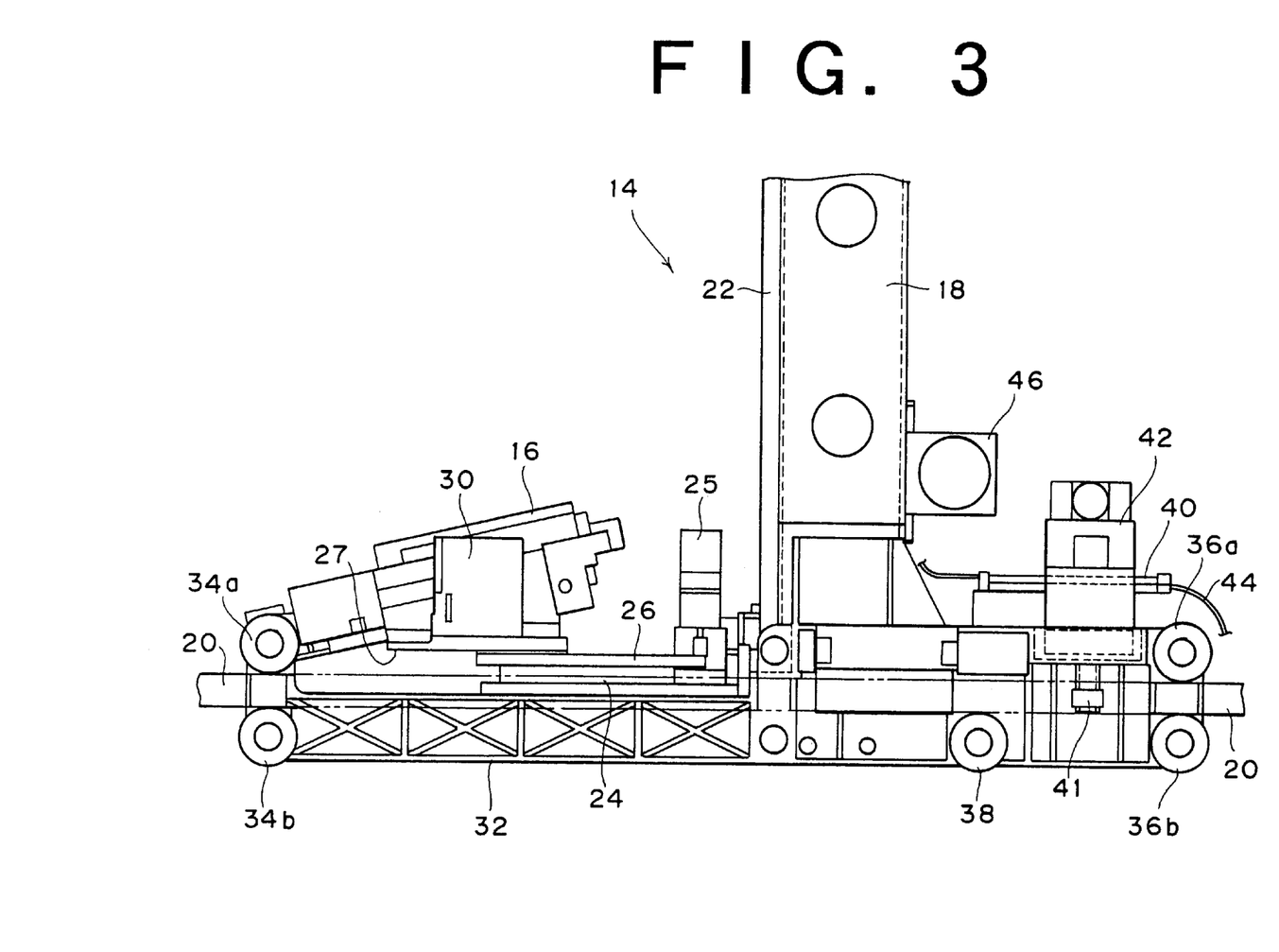
FIG. 3 is a side view of a mechanism for moving the accessor robot in an X-axis direction.

FIG. 3 is a side view illustrating a mechanism for moving each accessor robot 14 shown in FIG. 1 in the X-axis direction. A Y-axis motor 46 for reciprocatively moving the support base 24 along the guide rail 22 is fixed to the vertical column 18. The vertical column 18 is fixed supported to the rail base 32. A pair of rollers 34a and 34b and a pair of rollers 36a and 36b are rotatably fixed to the rail base 32. The rollers 34a and 34b hold the rail 20 therebetween at one end of the rail base 32, and the rollers 36a and 36b hold the rail 20 therebetween at the other end of the rail base 32. Another roller 38 is also fixed to the rail base 32 so as to be kept in contact with the rail 20. By adjusting a contact force between the roller 38 and the rail 20, a frictional force between the rail base 32 and the rail 20 can be adjusted.

An X-axis motor 42 is provided to move the rail base 32 along the rail 20. The motor 42 is fixed on the rail base 32. A pinion 41 is fixed to the output shaft of the motor 42 and is in mesh with a rack (not shown) mounted on a housing to which the rail 20 is fixed.

A printed circuit board 40 for a control circuit for controlling the Y-axis motor 46 and the X-axis motor 42 is fixed on the rail base 32. The printed circuit board 40 is connected to a control device provided in the control unit 4 (see FIG. 1) by a cable 44 to be hereinafter described in detail. The cable 44 is provided by an elastically deformable flat cable composed of a plurality of electric wires arranged in parallel and an insulating cover for insulating the electric wires, for example.

Figure 4:
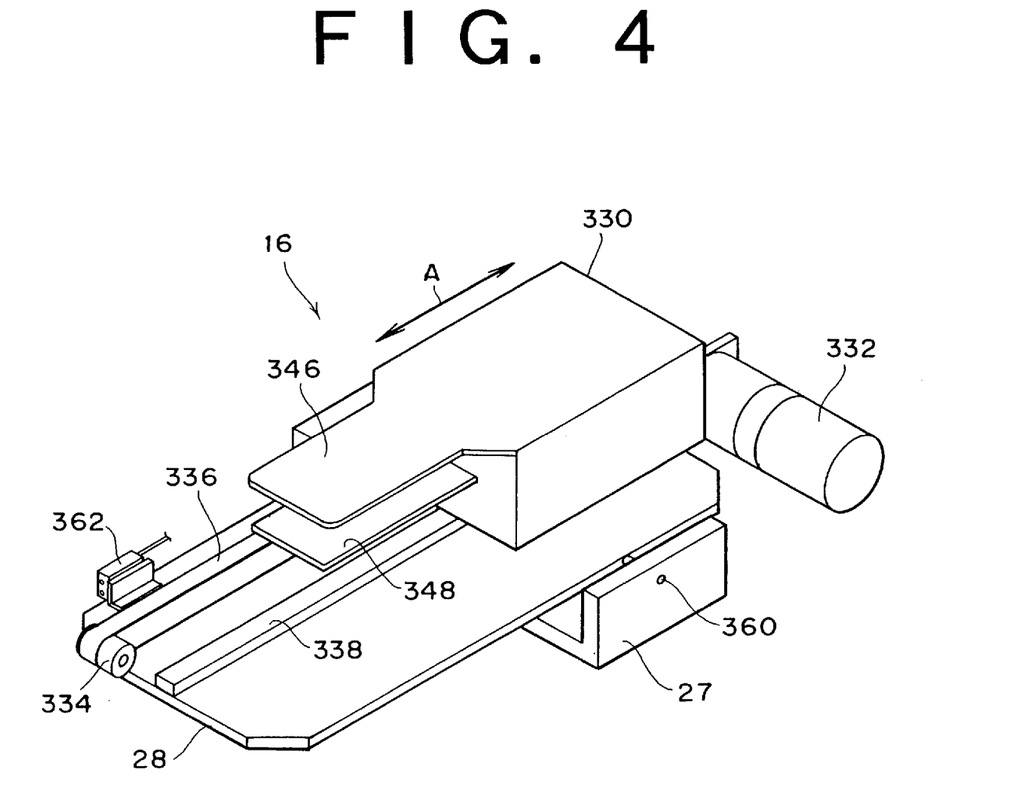
FIG. 4 is a schematic perspective view of a hand assembly shown in FIG. 1.

FIG. 4 is a schematic perspective view of the hand assembly 16 shown in FIG. 1. The hand assembly 16 is provided with a base 28. A hand unit 330 having an upper hand 346 and a lower hand 348 is mounted on the base 28 so as to be movable between an advanced position and a retracted position. The base 28 is provided so as to be pivotable about a horizontal shaft 360 supported to the base 27. A motor (not shown) for swinging the base 28 about the horizontal shaft 360 is mounted on the base 27.

A motor 332 for moving the hand unit 330 is mounted on the base 28 at its rear end portion. A pulley (not shown) is fixed to the output shaft of the motor 332. A pulley 334 is rotatably mounted on the base 28 at its front end portion. A timing belt 336 is wrapped between the pulley fixed to the output shaft of the motor 332 and the pulley 334. The timing belt 336 is connected to the hand unit 330.

When the motor 332 is driven, a driving force of the motor 332 is transmitted through the timing belt 336 to the hand unit 330, thereby moving the hand unit 330. The hand unit 330 makes a sliding motion between the advanced position and the retracted position along a guide rail 338 provided on the base 28. Because the timing belt 336 is connected to the hand unit 330, the hand unit 330 is driven by the motor 332 through the timing belt 336 and guided by the rail 338 to be moved therealong between the advanced position and the retracted position as shown by an arrow A.

A sensor 362 is provided at the front end of the base 28 of the hand assembly 16. The sensor 362 is used to detect whether or not a cartridge is present in each cell, for example.

In the library apparatus shown in FIG. 1, the accessor robots 14 for performing a specific operation are used as described above, thereby transferring the cartridge among each cartridge access station 5, each cell of the cell drums 15a and 15b, and each cartridge insertion/ejection opening of the magnetic tape drives of the drive units 12a to 12d. The access to each cell of the cell drums 15a and 15b may be made by rotational positioning of each cell drum, movement of the hand assembly 16 in the Y-axis direction, and rotation of the hand assembly 16 in the θ direction.

There will now be described a feeder mechanism characteristic of this preferred embodiment. This feeder mechanism is applied to each accessor robot 14 of the library apparatus shown in FIG. 1.

Figure 5:
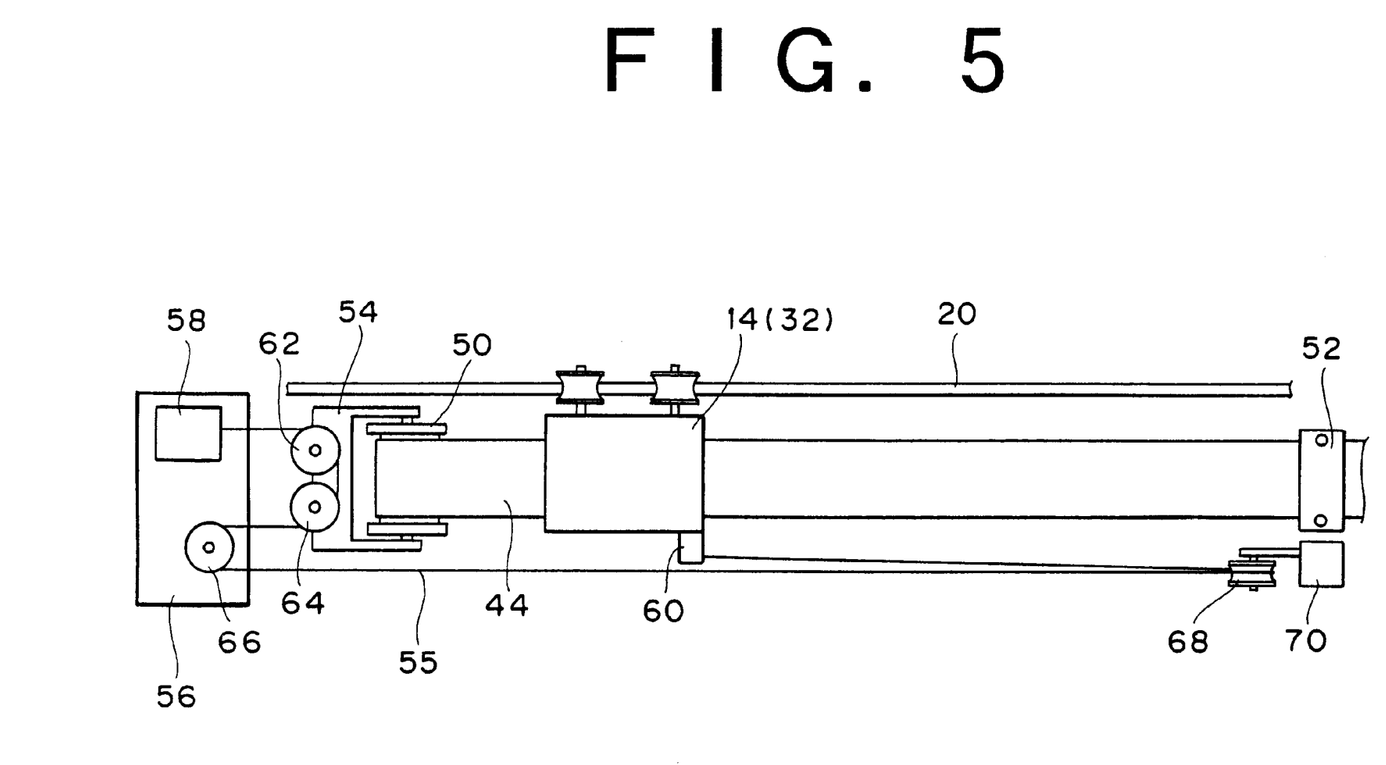
FIG. 5 is a plan view of a feeder mechanism applied to the library apparatus shown in FIG. 1.
Figure 6:
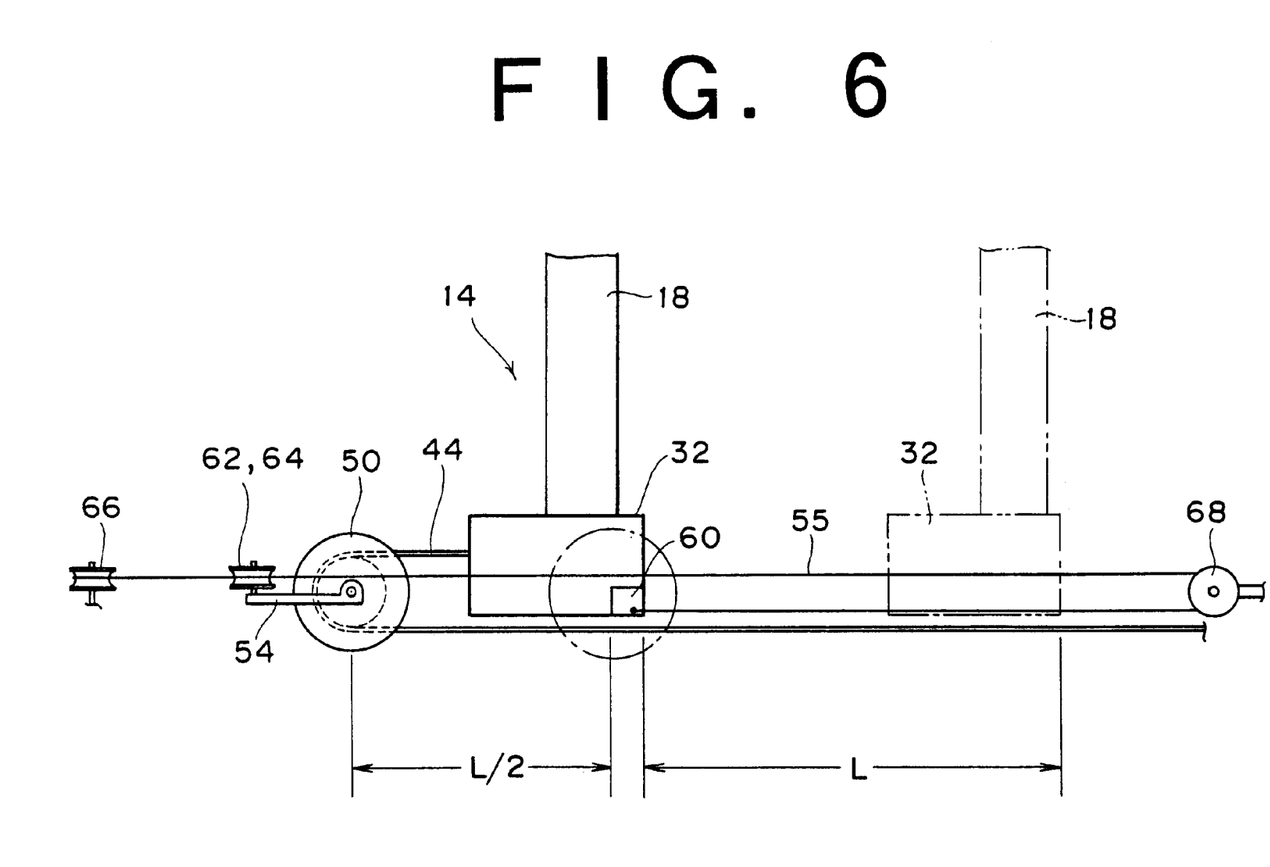
FIG. 6 is a side view for illustrating the operation of the feeder mechanism shown in FIG. 5.

FIG. 5 is a plan view of this feeder mechanism, and FIG. 6 is a side view for illustrating the operation of the feeder mechanism. The flat cable 44 is used to transfer a control signal between the accessor robot 14 and an external circuit (e.g., a circuit in the control unit 4 shown in FIG. 1) and/or supply electric power to the accessor robot 14. The flat cable 44 is fixed at its one end to the rail base 32 of the accessor robot 14, and fixed at the other end to the housing of the library apparatus by means of a fastener 52. The flat cable 44 is wrapped 180° around a cable drum 50 movable in the X-axis direction along the rail 20 together with the accessor robot 14. Accordingly, the fixed position of the flat cable 44 defined by the fastener 52 is a reference position of the feeder mechanism.

The cable drum 50 is rotatably supported by a U-shaped arm 54. To always apply a predetermined tension to the flat cable 44, a wire rope 55 acting on the arm 54 is used. One end of the wire rope 55 is connected to a winding mechanism 58 provided on a pulley support 56 fixed to the housing, and the other end of the wire rope 55 is connected through a torsional stress removing mechanism 60 to the rail base 32 of the accessor robot 14. The removing mechanism 60 rotatably supports the wire rope 55, and its detailed configuration will be hereinafter described.

To wrap the wire rope 55, two idler pulleys 62 and 64 are rotatably supported to the arm 54, and a stationary pulley 66 is rotatably supported to the pulley support 56. Further, another stationary pulley 68 is rotatably supported to a pulley support 70 located in the vicinity of the fastener 52. The pulley support 70 is fixed to the housing. Accordingly, the stationary pulleys 66 and 68 are fixed with respect to the reference position. The pulleys 62, 64, and 66 have rotating shafts parallel to the Y axis, and the cable drum 50 and the pulley 68 have rotating shafts parallel to the Z axis. The wire rope 55 is wrapped 90° around each of the idler pulleys 62 and 64, that is, wrapped 180° totally around the idler pulleys 62 and 64, further wrapped 180° around the stationary pulley 66, and further wrapped 180° around the stationary pulley 68.

According to the configuration of this feeder mechanism, when the accessor robot 14 is driven to move a distance L in the X-axis direction as shown in FIG. 6, the cable drum 50 and the arm 54 follow the movement of the accessor robot 14 to move a distance L/2 in the same direction. During this movement, a fixed tension is kept applied to the flat cable 44 by the wire rope 55, so that the flat cable 44 is prevented from slacking to thereby always allow good feeding irrespective of the position of the accessor robot 14 along the X axis.

Figure 7:
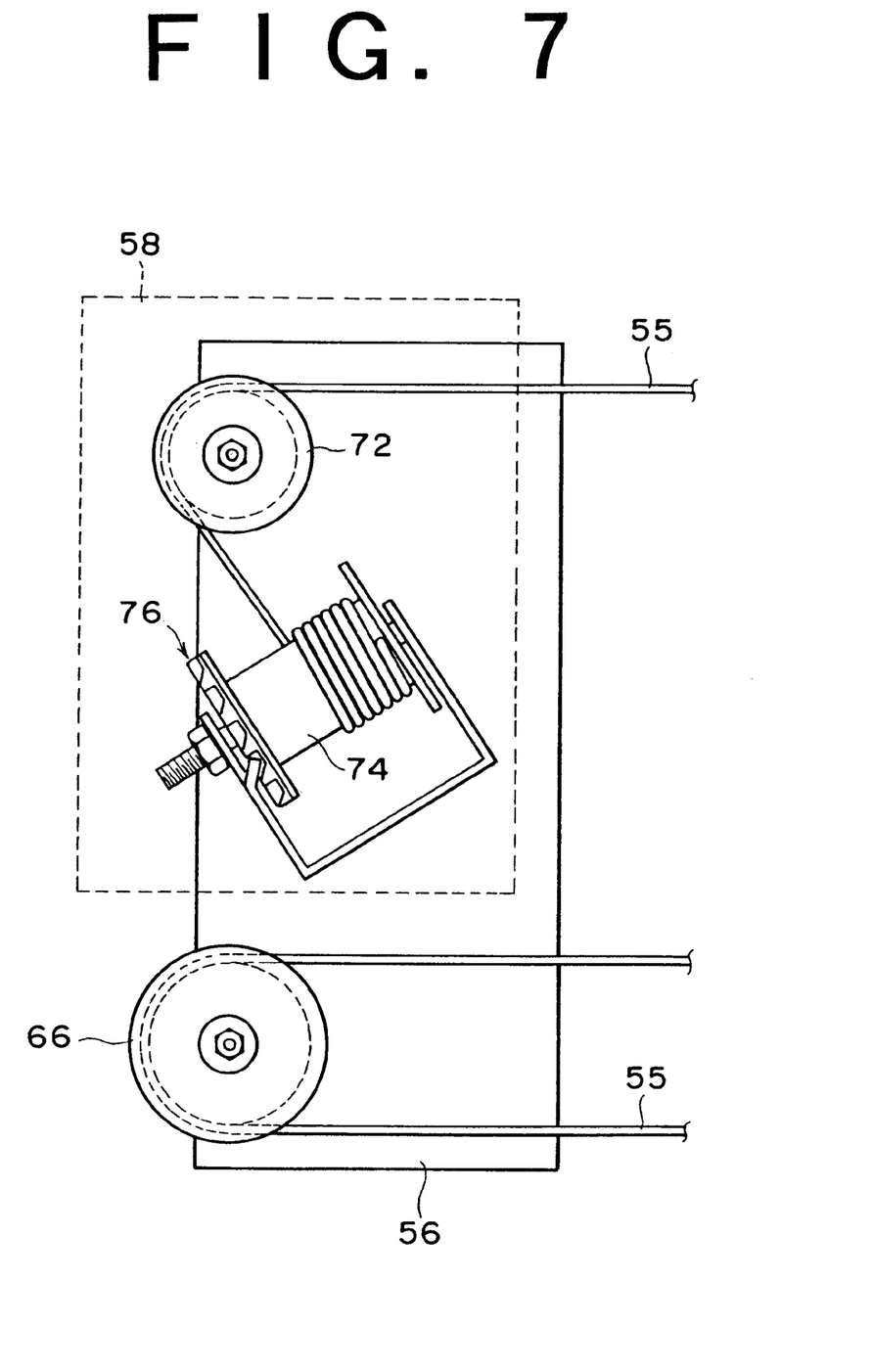
FIG. 7 is a plan view of a rope winding mechanism shown in FIG. 5.

FIG. 7 is a plan view of the winding mechanism 58 shown in FIG. 5. The winding mechanism 58 includes a stationary pulley 72 around which the wire rope 55 is wrapped at least 90° and a winding reel 74 around which an end and its near portion of the wire rope 44 is wound. The stationary pulley 72 is rotatably fixed to the pulley support 56, and has a rotating shaft parallel to the Y axis. The reel 74 has a rotating shaft perpendicular to the Y axis and inclined about 45° to the X axis and the Z axis in this preferred embodiment. The reel 74 is additionally provided with a ratchet mechanism 76 for allowing rotation of the reel 74 in only one direction. Accordingly, in stretching the wire rope 55 to obtain the feeder mechanism shown in FIG. 5, one end of the wire rope 55 is first fixed to the reel 74, and the reel 74 is next rotated in one direction by use of the ratchet mechanism 76, thereby obtaining a required tension of the wire rope 55. The required tension of the wire rope 55 is determined by the predetermined tension to be applied to the flat cable 44.

The wire rope 55 is formed by twisting seven strands and covering the twisted strands with a nylon coating having a thickness of 0.3 mm, for example. The diameter of the wire rope 55 is 1.8 mm. Each strand is formed by twisting 19 stainless steel wires each having a diameter of 0.01 mm, for example.

In forming or mounting a wire rope, there is a possibility of torsion of the wire rope. Further, during the use of the wire rope, the torsion of the wire rope is changed by friction with pulleys to cause a so-called "overtwisting" or "backtwisting" phenomenon, which may deteriorate the fatigue characteristics of the wire rope. To prevent such a deterioration in the fatigue characteristics of the wire rope, this preferred embodiment employs the stress removing mechanism 60 for removing the torsional stress of the wire rope 55 at one end of the wire rope 55.

Figure 8:
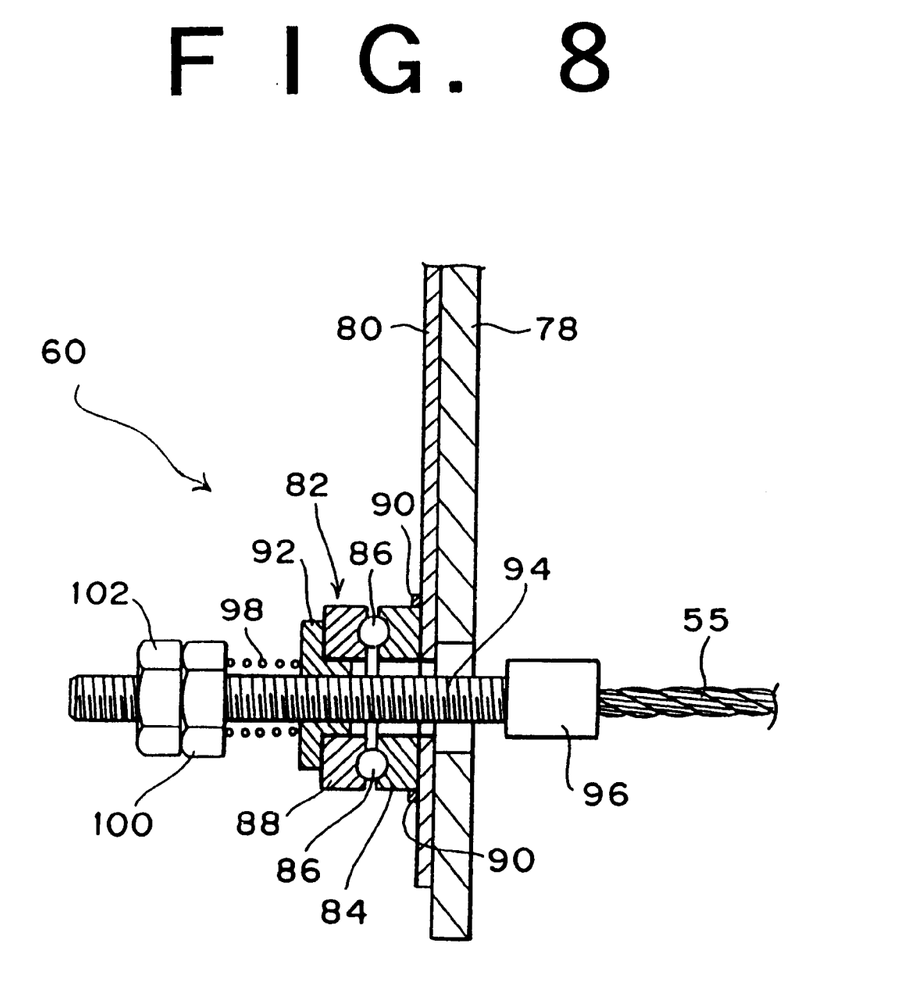
FIG. 8 is a sectional view of a stress removing mechanism shown in FIG. 5.

Referring to FIG. 8, there is shown a sectional view of the stress removing mechanism 60. A thrust bearing 82 is provided through a leaf spring 80 on a frame 78 of the rail base 32 (the accessor robot 14). The thrust bearing 82 is composed of a ringlike fixed member 84, a ringlike rotating member 88, and a plurality of balls 86 interposed between the fixed member 84 and the rotating member 88. The fixed member 84 is positioned on the leaf spring 80 by dowels 90, and the rotating member 88 is smoothly rotatable relative to the fixed member 84 by the balls 86. A bolt 94 engaged with a collar 92 is inserted through a center hole of the thrust bearing 82. The bolt 94 is inserted also through holes formed through the frame 78 and the leaf spring 80. The bolt 94 is connected at its front end through a connector 96 to one end of the wire rope 55. Double nuts 100 and 102 are engaged with a rear end portion of the bolt 94, and a coil spring 98 for absorbing changes in tension of the wire rope 55 is interposed between the collar 92 and the nut 100. The coil spring 98 is formed of stainless steel. As the thrust bearing 82, SST-1750-DSG manufactured by Nihon Miniature Bearing Co., Ltd., for example, may be used.

In this preferred embodiment, the coil spring 98 functions as an absorber for absorbing changes in tension of the wire rope 55. That is, in a steady state as in a rest condition of the accessor robot 14, the coil spring 98 is kept in a compressed condition so as to balance the tension of the wire rope 55, whereas at acceleration or deceleration of the accessor robot 14, the coil spring 98 is compressed or expanded from the steady state to convert energy due to tension changes of the wire rope 55 into heat, thereby absorbing the tension changes.

Typically, the maximum moving speed of the accessor robot 14 is 3 m/sec, and the absolute value of an acceleration of the accessor robot 14 at acceleration or deceleration is about 3 m/sec$^2$. The tension applied to the wire rope 55 at acceleration or deceleration is calculated to 30 kgf to 45 kgf from the above acceleration and the mass of the accessor robot 14. Under the possibility that such a large tension is applied to the wire rope 55, it is possible to obtain a great effect of improving the fatigue characteristics of the wire rope 55 by using the absorber for absorbing tension changes of the wire rope 55.

In this preferred embodiment, the thrust bearing 82 is used as a main component of the stress removing mechanism 60, and rotational friction between the fixed member 84 and the rotating member 88 is extremely small, so that a torsional stress of the wire rope 55 can be easily removed. As a result, the fatigue characteristics of the wire rope 55 can be improved to thereby improve the long-term reliability of the library apparatus. Particularly in the case that additional drum units and drive units are provided in the library apparatus shown in FIG. 1, the length of the X-axis rail 20 becomes as long as 20 m to 30 m. Accordingly, when the wire rope 55 becomes long in association with such a long rail 20, the effect of improving the fatigue characteristics of the wire rope 55 by removing the torsional stress of the wire rope 55 becomes remarkable.

In this preferred embodiment, at least one idler pulley (the pulleys 62 and 64) provided on the arm 54 and at least two stationary pulleys (the pulleys 66 and 68) fixed with respect to the reference position are used, and the wire rope 55 is wrapped around these pulleys. Accordingly, the tension of the wire rope 55 can be always applied to the arm 54, thereby allowing a constant tension to be applied to the flat cable 44 irrespective of the position of the accessor robot 14.

Further, since the tension changes of the wire rope 55 are reduced by using the absorber, it is possible to also reduce tension changes of the flat cable 44 at acceleration or deceleration of the accessor robot 14, thereby further improving the reliability of the feeder mechanism.

Figure 9:
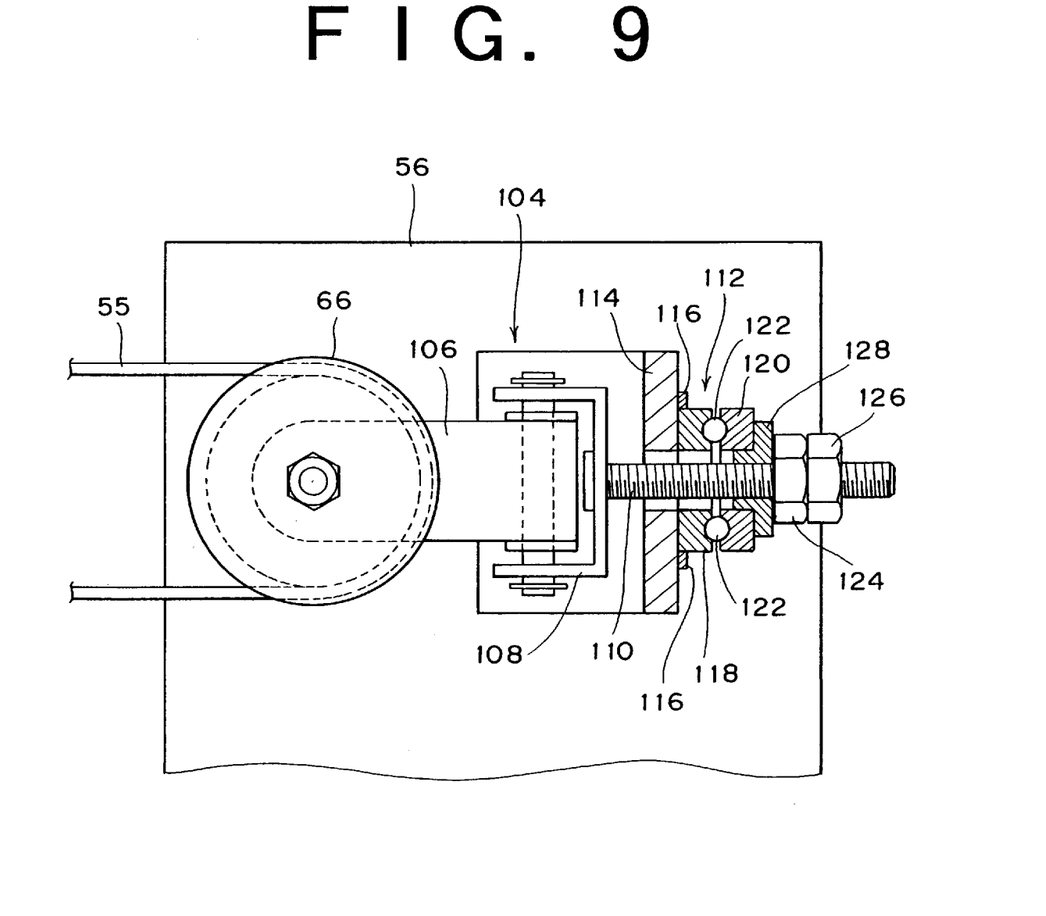
FIG. 9 is a partially cutaway, plan view of an aligning mechanism applicable to the feeder mechanism shown in FIG. 5.
Figure 10:
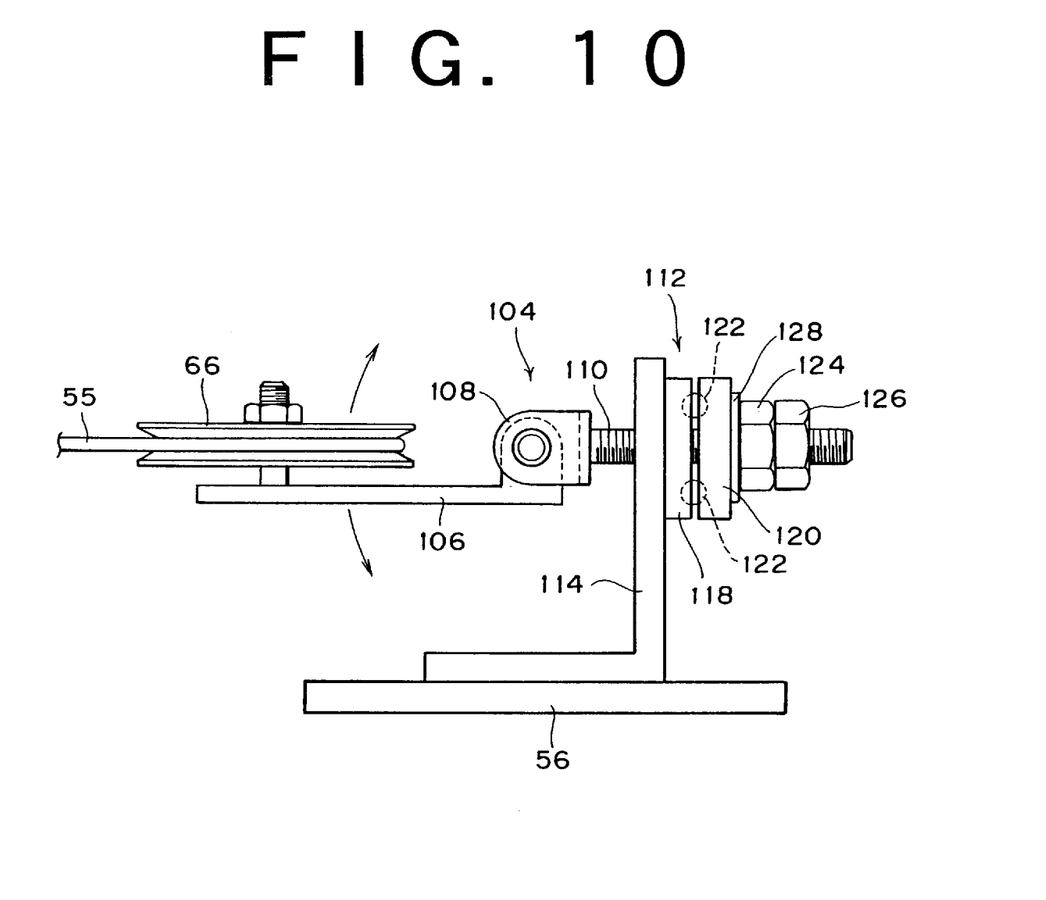
FIG. 10 is a side view of the aligning mechanism shown in FIG. 9.

FIG. 9 is a partially cutaway, plan view of an aligning mechanism applicable to the feeder mechanism shown in FIG. 5, and FIG. 10 is a side view of the aligning mechanism shown in FIG. 9. This aligning mechanism serves to support the stationary pulley 66 so that it is pivotable about two axes perpendicular to the rotating shaft of the pulley 66.

More specifically, the aligning mechanism includes a support member 106 for rotatably supporting the pulley 66 about the rotating shaft parallel to the Y axis, another support member 108 for pivotably supporting the support member 106 about a pivotal shaft parallel to the Z axis, and a thrust bearing 112 for rotatably supporting a bolt 110 fixed to the support member 108 about a rotational axis parallel to the X axis. The thrust bearing 112 is composed of a fixed member 118 positioned through dowels 116 to a sectionally L-shaped bracket 114 fixed on the pulley support 56, a rotating member 120 rotatable relative to the fixed member 118, and a plurality of balls 122 interposed between the fixed member 118 and the rotating member 120. The bolt 110 is connected through a collar 128 to the rotating member 120 of the thrust bearing 112 by means of double nuts 124 and 126. The thrust bearing 112 may be of the same kind as that of the thrust bearing 82 shown in FIG. 8.

By using the aligning mechanism as mentioned above, the following effects can be exhibited. First, even when the wire rope 55 is lowered by its own weight, the support member 106 is tilted about the pivotal shaft parallel to the Z axis, thereby effecting automatic alignment to always keep the perpendicularity of the wire rope 55 to the rotating shaft of the pulley 66. Therefore, an undue increase in contact area between the wire rope 55 and the groove of the pulley 66 can be prevented, thereby reducing wear of the wire rope 55 and/or the pulley 66.

Furthermore, in the case that the arm 54 is in a relatively near position to the pulley 66 and accordingly a portion of the wire rope 55 on only one side of the pulley 66 is lowered, the support member 108 and the bolt 110 are rotated about the rotational axis parallel to the X axis, thereby automatically following such one-side lowering of the wire rope 55 with respect to the pulley 66.

In addition, a mounting accuracy of the pulley support 56 can be relaxed by use of the aligning mechanism. That is, in the case that the pulley 66 is supported directly to the pulley support 56 as shown in FIG. 5, high-accuracy alignment of the rotating shaft of the pulley 66 is necessary to prevent wear of the wire rope 55 due to slack or the like of the wire rope 55. To the contrary, such a high mounting accuracy of the pulley 66 or the pulley support 56 can be reduced by use of the aligning mechanism mentioned above.

While the aligning mechanism is applied to the pulley 66 in the above description with reference to FIGS. 9 and 10, this kind of aligning mechanism may be applied to the pulley 68 shown in FIG. 5. By applying such an aligning mechanism to the pulley 68, wear of the wire rope 55 and/or the pulley 68 can be reduced in accordance with the same principle, thereby improving the long-term reliability of the library apparatus. In this case, the rotating shaft of the pulley 68 is parallel to the Z axis, and accordingly the lowering of the wire rope 55 due to its own weight may not have so adverse effect, so that the aligning mechanism may be configured so as to pivotably support the pulley 68 about one axis perpendicular to its rotational axis (e.g., an axis parallel to the X axis).

Figure 11:
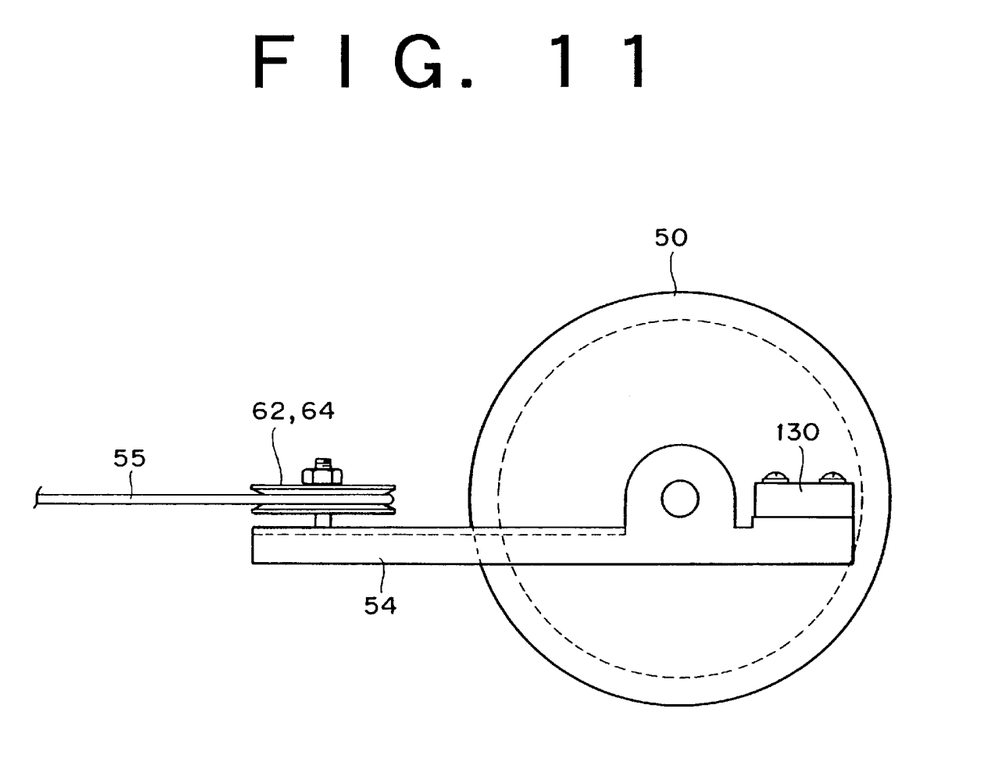
FIG. 11 is a side view showing a modification of an arm shown in FIG. 5.

FIG. 11 is a side view showing a modification of the arm 54 shown in FIG. 5. As shown in FIG. 11, a balance weight 130 for correcting a weight distribution of the arm 54 is used to make the idler pulleys 62 and 64 rotate in a substantially horizontal plane. More specifically, two balance weights 130 (one of which being shown) are provided on the arm 54 opposite to the idler pulleys 62 and 64 with respect to the rotating shaft of the cable drum 50. The two balance weights 130 are provided on the opposite sides of the cable drum 50.

According to this modification, the pulleys 62 and 64 are rotated in a substantially horizontal plane, so that the wire rope 55 can easily take a position perpendicular to the rotating shafts of the idler pulleys 62 and 64. As a result, wear of the wire rope 55 can be prevented to thereby improve the long-term reliability of the library apparatus.

Figure 12:
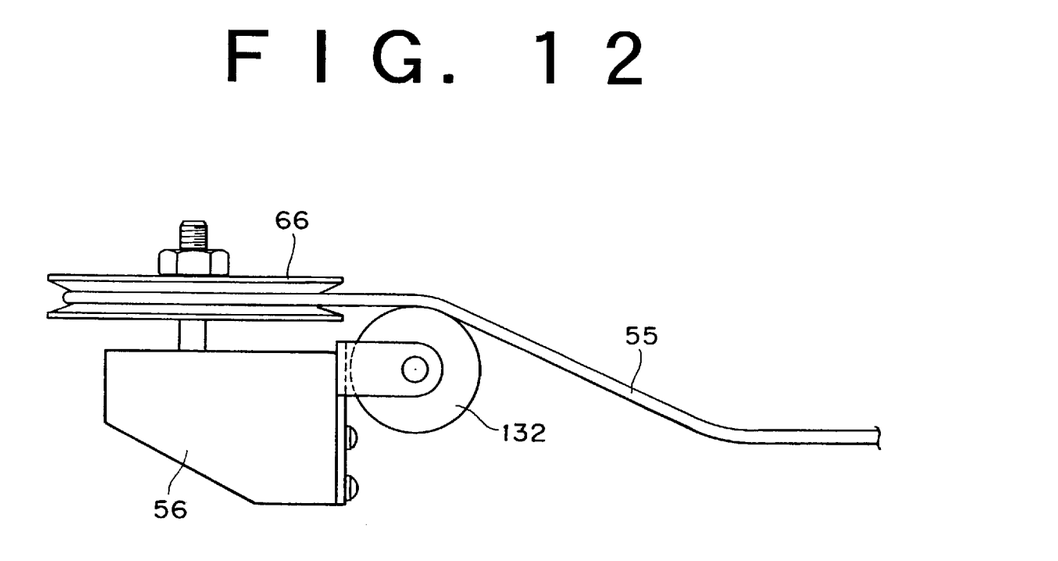
FIG. 12 is a side view of another preferred embodiment employing an idler added to the feeder mechanism shown in FIG. 5.

FIG. 12 is a side view of a preferred embodiment employing an idler added to the feeder mechanism shown in FIG. 5. In the feeder mechanism shown in FIG. 5, the rotating shaft of the stationary pulley 66 extends in a vertical direction (a direction parallel to the Y axis). Accordingly, there is a possibility that the wire rope 55 may be slackened by its own weight, causing wear of the wire rope 55 and/or the pulley 66. In this preferred embodiment shown in FIG. 12, an idler 132 rotatable in contact with the wire rope 55 is provided in the vicinity of the rotating shaft of the pulley 66. The idler 132 is in the form of drum, and is rotatably provided on the pulley support 56 about a rotational axis parallel to the Z axis. The idler 132 is positioned in such a manner that the highest position of the outer circumferential surface of the idler 132 corresponds to the center position of the guide of the pulley 66 around which the wire rope 55 is wrapped. With this positioning, a portion of the wire rope 55 in the vicinity of the pulley 66 can be maintained perpendicular to the rotating shaft of the pulley 66, thereby preventing wear of the wire rope 55. As a result, the life of the wire rope 55 can be extended to thereby improve the reliability of the library apparatus.

While the stress removing mechanism 60 for removing the torsional stress of the wire rope 55 is provided on the accessor robot 14 in the feeder mechanism shown in FIG. 5, a similar stress removing mechanism acting on the other end of the wire rope 55 may be provided on the pulley support 56. Alternatively, two stress removing mechanisms acting on the opposite ends of the wire rope 55 may be provided on the accessor robot 14 and the pulley support 56.

While the preferred embodiment shown in FIG. 5 employs at least one idler pulley and at least two stationary pulleys for wrapping the wire rope 55 therearound, so as to make the wire rope 55 for applying a tension to the flat cable 44 act on the arm 54, the present invention is not limited to this configuration. For example, the feeder mechanism may be configured by connecting one end of a wire rope to the arm 54 and connecting the other end of the wire rope to a spring fixed to the housing, whereby an always stable tension is applied to the flat cable 44 by a biasing force of the spring. Also in this case, a stress removing mechanism for removing the torsional stress of the wire rope is provided at least one end of the wire rope to thereby improve the fatigue characteristics of the wire rope and therefore improve the reliability of the library apparatus.

While the feeder mechanism of the present invention is applied to the library apparatus in the above description, similar effects can be obtained also in the case that the present invention is applied to a mobile robot movable along at least one straight line.

Finally, the priority of the present invention or its preferred embodiments will generally be described in comparison with the prior art (especially a library apparatus). In the conventional library apparatus, the moving speed and the acceleration of an accessor robot are low, so that damage to a wire rope is negligibly small. In recent years, however, the moving speed and the acceleration of an accessor robot have been increased to cause a significant damage to a wire rope and in some case reach an unserviceable condition of the wire rope.

The present inventor initially considered that such an unserviceable condition of the wire rope is caused by the development of torsion of the wire rope in concert with the increase in acceleration of the accessor robot. However, whether the development of torsion of the wire rope becomes "overtwisting" or "backtwisting" is determined by a moving direction of the accessor robot. Accordingly, in the case of an accessor structure adapted to linearly move, the travels of the accessor robot in the opposite directions are substantially equal. Therefore, although torsion occurs in the wire rope, the torsion is finally canceled to thereby remove a torsional stress in the wire rope. Thus, it is difficult to consider that the unserviceable condition of the wire rope is caused by the development of torsion of the wire rope.

Then, the present inventor made a measurement on the manner of torsion of the wire rope. As the result of measurement, it became apparent that "overtwisting" and "backtwisting" of the wire rope expectedly occurred in association with movement of the accessor robot, and that the torsion of the wire rope after the test was not returned to the condition before the test. More specifically, it was observed that the torsion of the wire rope tends to be increased in a certain direction with the use of the apparatus.

On the basis of the above test, the present inventor has considered that the cause of the torsion is related largely with the acceleration of the accessor robot, and that the cause of accumulation of the torsion falls in an operational condition of the library apparatus. That is, in the case that the library apparatus has cell storage shelves on the opposite sides and an accessor robot linearly movable between the cell storage shelves as in the above preferred embodiments, the moving direction and the travel of the accessor robot are various. That is, the travel of the accessor robot is different every time the library apparatus is used, and the acceleration of the accessor robot is also different every time because the accessor robot must be positioned in a shortest period of time.

Assuming that the torsion of the wire rope depends on the acceleration of the accessor robot, the number of times of movement and the acceleration of the accessor robot in a direction where "overtwisting" occurs are different from the number of times of movement and the acceleration of the accessor robot in a direction where "backtwisting" occurs in the library apparatus according to the present invention. As a result, the extent of one of "overtwisting" and "backtwisting" becomes larger than the extent of the other, causing the accumulation of the torsion.

Accordingly, it can be said that such a phenomenon is one characteristic of the above-mentioned library apparatus having opposed cell storage shelves and an accessor robot linearly movable between the cell storage shelves, and required to carry out random access to any cartridge stored in the cell storage shelves.

The accumulation of the torsion can be solved by removing the torsional stress of the wire rope according to the present invention, thereby exhibiting the remarkable effects that the life of the wire rope can be extended and the reliability of the library apparatus using the wire rope can be improved.

In general, a wire rope is formed by twisting a plurality of steel wires. In this twisting step, the wire rope is prone to fall into a tendency of torsion. Although attempts have been made to remove this tendency, it cannot be completely removed. Further, the tendency of torsion varies according to the wire rope. In some case, the wire rope is stretched under a torsional stress. When the wire rope is driven under such a torsional stress, the fatigue characteristics of the wire rope deteriorate.

According to the present invention, the feeder mechanism using the wire rope for applying a tension to the feeding cable includes means for removing the torsional stress of the wire rope. Accordingly, the life of the wire rope can be extended, and the reliability of the feeder mechanism or the library apparatus having the feeder mechanism can be improved.

Upon starting or stopping the accessor robot, there is a possibility that an excess tension may be applied to the wire rope, causing the fatigue of the wire rope.

According to a specific preferred embodiment of the present invention, the absorber is adopted for reducing tension changes of the wire rope. Accordingly, although an excess tension is applied to the wire rope at starting or stopping the accessor robot, such a tension can be effectively absorbed by the absorber, thereby improving the durability of the wire rope.

Further, there is a possibility that the alignment of the pulley shaft varies according to an accuracy of fabrication of the housing or an accuracy of manufacturing of the pulley support, causing the torsion of the wire rope. A poor alignment of the pulley shaft invites an increase in contact area between the pulley and the wire rope, causing easy wearing of the wire rope.

According to a specific preferred embodiment of the present invention, the aligning mechanism is adapted for pivotably supporting the pulley about two axes perpendicular to the rotating shaft of the pulley. Accordingly, the alignment of the pulley can be maintained, thereby improving the durability of the wire rope.

According to a specific preferred embodiment of the present invention, the balance weight for correcting a weight distribution of the arm so as to allow rotation of the pulley in a substantially horizontal plane is adopted. Accordingly, the alignment of the pulley shaft can be maintained, thereby improving the durability of the wire rope.

Further, there is a possibility that the wire rope expected to be stretched horizontally may be lowered by its own weight, causing torsion or wear of the wire rope to shorten the life of the wire rope.

According to a specific preferred embodiment of the present invention, the idler adapted to be driven by the wire rope is provided in the vicinity of the pulley. Accordingly, lowering of the wire rope can be prevented by the idler, thereby improving the durability of the wire rope.

What is claimed is:

1. A library apparatus comprising:
    a cell unit having a plurality of cells each for storing a cartridge in which a recording medium is contained;
    a drive unit for performing processing on said recording medium;
    an accessor robot for transferring said cartridge between said cell unit and said drive unit;
    a feeding cable having a first end and a second end, said first end being connected to said accessor robot, said second end being fixed to a reference position;
    a cable drum for wrapping said feeding cable therearound;
    an arm for rotatably supporting said cable drum;
    a wire rope acting on said arm to apply a tension to said feeding cable; and
    means for removing a torsional stress of said wire rope, said removing means being connected to at least one end of said wire rope and rotatably supporting said wire rope.

2. A library apparatus according to claim 1, wherein said removing means comprises a thrust bearing fixed to said accessor robot or fixed with respect to said reference position.

3. A library apparatus according to claim 1, further comprising an absorber for absorbing changes in tension of said wire rope.

4. A library apparatus according to claim 1, further comprising:
    at least one idler pulley provided on said arm; and
    at least two stationary pulleys fixed with respect to said reference position;
    one end of said wire rope being fixed with respect to said reference position, the other end of said wire rope being connected through said idler pulley and said stationary pulleys to said accessor robot.

5. A library apparatus according to claim 4, further comprising an aligning mechanism for pivotably supporting at least one of said stationary pulleys about two axes perpendicular to a rotating shaft of said at least one stationary pulley.

6. A library apparatus according to claim 4, further comprising a balance weight for correcting a weight distribution of said arm so that said idler pulley is rotated in a substantially horizontal plane.

7. A library apparatus according to claim 4, wherein at least one of said stationary pulleys has a rotating shaft extending in a vertical direction;
    said library apparatus further comprising an idler adapted to be driven by said wire rope in the vicinity of said rotating shaft.

* * * * *